INVENTOR.
Thomas F. Jentsch
BY
Hansen and Lane
His Attorneys

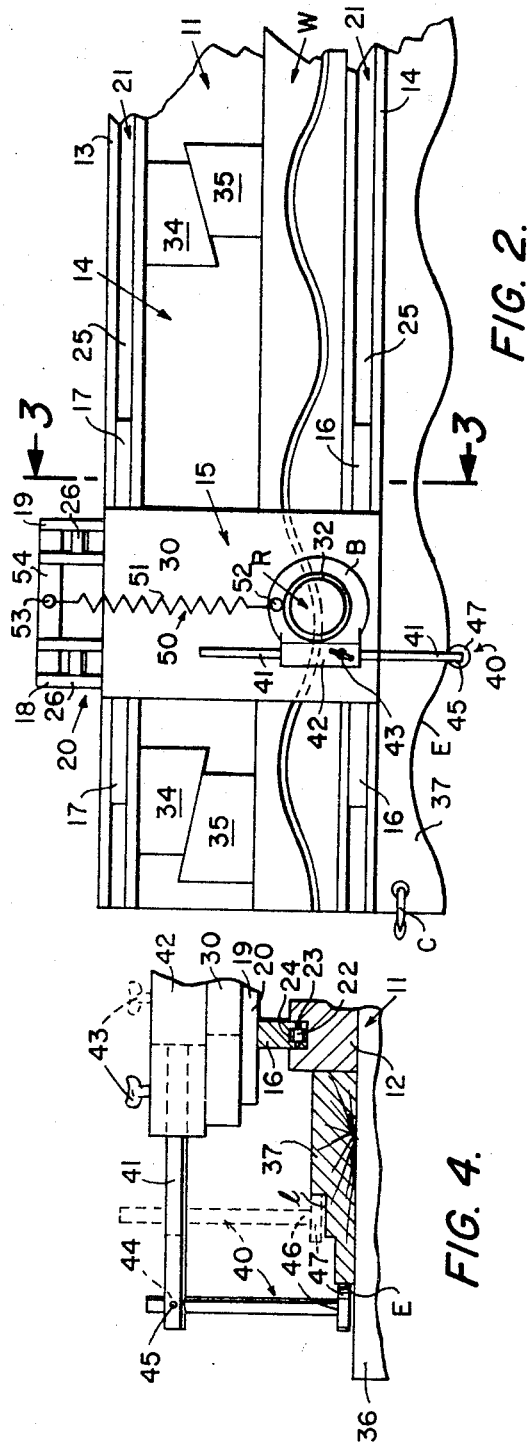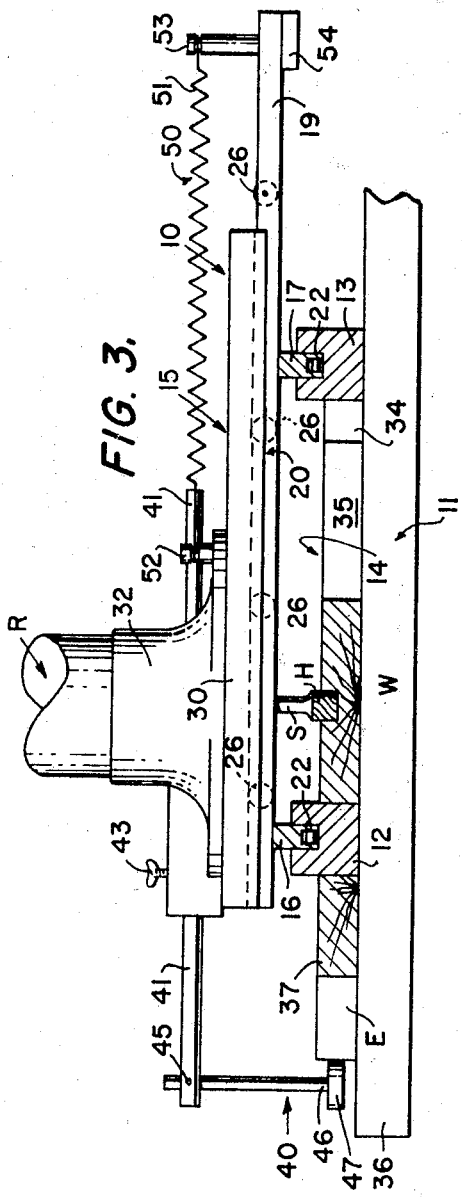

United States Patent Office 3,442,309
Patented May 6, 1969

---

3,442,309
COMBINATION TEMPLATE, WORK SUPPORT AND GUIDE FOR ROUTER
Thomas F. Jentsch, 7064 Bollinger Road,
San Jose, Calif. 95129
Filed Feb. 13, 1967, Ser. No. 615,776
Int. Cl. B27c 5/02
U.S. Cl. 144—144          10 Claims

ABSTRACT OF THE DISCLOSURE

An apparatus for supporting material to be worked upon parallel to a template and supporting a carriage for a router for guided movement in any direction along a horizontal plane in accordance with the shape of such template.

BACKGROUND OF THE INVENTION

The most pertinent references found in class 144, subclass 144–145 included: Creek et al., 1,981,584, Nov. 20, 1934; Schacher, 2,726,690, Dec. 13, 1935; Gilry, 3,099,299, July 30, 1963; Jones, 3,109,466, Nov. 5, 1963.

While the prior known devices disclose guide attachments for portable routers none discloses a guide in combination with a work and template supporting arrangement embodying the present invention. Moreover, none of these prior devices teach or suggest a universally movable carriage for a portable router. Neither do they provide means embodied in the work and template support for guiding the router and carriage in the manner of the structure of the present invention.

It is an object of the present invention to provide an elongated channel support for material to be worked upon and having upstanding flanges providing guide tracks for a carriage movable along the latter. In this connection it is a further object to provide such carriage with a transversely movable table for supporting a conventional portable router facilitating both transverse and longitudinal movement of the latter in a horizontal plane.

It is a further object to provide such channel support with a template engaging face and means on the router carriage engageable with a template engaging such support to follow the contour thereof and reproduce such contour at the cutting head of the router as it moves relative to the material supported in the channel.

These and other objects and advantages of the present invention will become apparent from a reading of the following description and claims in the light of the accompany two sheets of drawing in which:

FIG. 2 is a plan view of FIG. 1 and at reduced scale with respect thereto.

FIG. 3 is a transverse section through FIG. 2 and taken substantially along line 3—3 thereof.

FIG. 4 is a section of a portion of FIG. 3 illustrating a different form of template and variable settings therefor.

Figure 1:
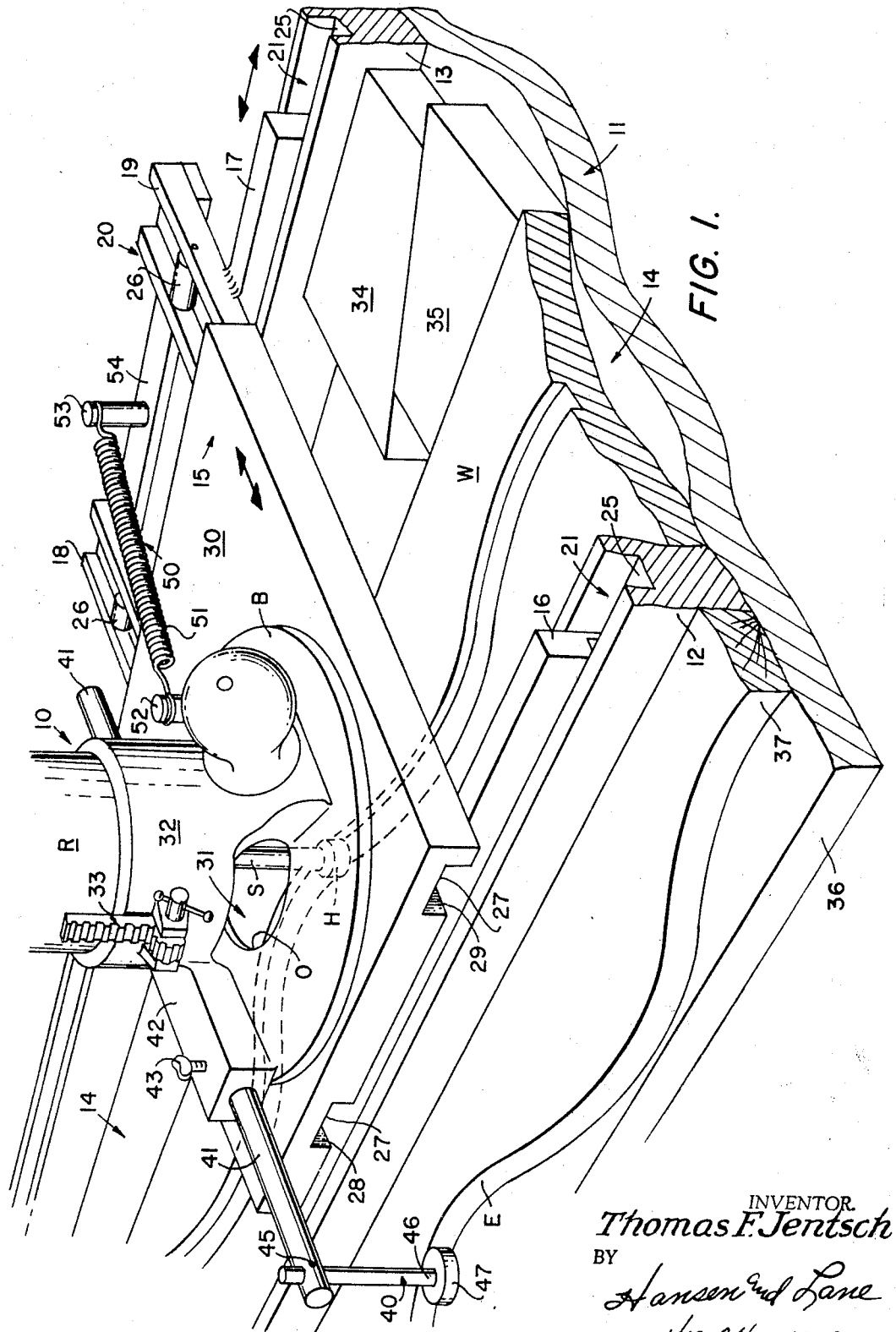
FIG. 1 is a fragmentary perspective view of a template and work support combined with a router supporting carriage and guide therefor in accordance with the present invention.

In the drawing the device of the present invention 10 includes a table or base 11 having spaced parallel upstanding rails 12 and 13 forming an elongated channel 14 within which material such as wood W to be worked upon is adapted to be supported. The upstanding rails 12 and 13 constitute tracks for supporting a carriage 15 in bridge-like fashion above material supported within the channel thus formed.

The carriage 15 comprises a pair of skids or roller bars 16 and 17 joined by transverse roller tracks 18 and 19 to form an open square or rectangular shaped frame 20. The roller bars 16 and 17 are disposed to ride the tracks provided by the rails 12 and 13, respectively, so that the frame 20 is guided for movement longitudinally of the channel 14.

In the present disclosure the rails 12 and 13 have their upper edges grooved as at 21 to provide channels into which the roller bars 16 and 17 fit for guided sliding movement. The roller bars 16 and 17 each have a plurality of rollers 22 mounted on pivot pins 23 and in recesses 24 formed in the lower edges of the bars 16 and 17. The rollers 22 are spaced along the length of these bars 16 and 17 and extend slightly beyond the lower edge of the latter so that the rollers, only, have tangent contact with the floor 25 of the channel track provided in each rail 12 and 13.

The transverse roller tracks 18 and 19 are secured to the top edge of the roller bars 16 and 17 as by welding, gluing or the like. Each roller track 18 and 19 is provided with a plurality of rollers 26 journaled on axle pins supported in the tracks in spaced relation along the same. The rollers 26 extend slightly above the upper edge of the respective track for tangent engagement with the horizontal ceiling 27 of a guide groove formed on the underside of a platform 30. Two such guide grooves 28 and 29 are provided to seat upon and be guided by the roller tracks 18 and 19 respectively. The arrangement is such that the platform 30 is guided for rolling movement transversely of the channel 14 and movable longitudinally of the latter along with the frame 20. Thus it will be seen that the carriage 15 has dual directional mobility above the channel 14.

The platform 30 is adapted to support a router R for movement therewith. The router R may be any one of the well known portable type tools having a flange type base B provided with an open center O through which a cutting head or bit H mounted in the drive chuck of the router can extend for cutting into material beyond the surface upon which the router base is mounted. The platform 30 has an opening 31 formed therethrough midway between the guide grooves 28 and 29. The base B of the router R is mounted on the platform with the opening O in the base in register with the opening 31 in the platform. The router base B may be secured to the platform 30 in any suitable manner such as by bolts or the like.

The base B of the router R has a sleeve-like upper end 32 within which the motor housing M of the router is mounted for up and down guided movement relative to the platform and the channel 14. Any suitable adjusting means, such as the rack and pinion 33 shown in FIG. 1, is employed to set the motor housing in various positions of elevation within the sleeve 32 of the base B. In this manner the cutting head of the bit H can be set at various positions for depth of cut into material W supported in the channel 14.

The material W to be worked upon is secured within the channel 14 in any suitable manner to expose the material W to the cutting bit H without obstructing the dual directional movement of the latter, carriage 15 and frame 20. As shown in FIGS. 1 and 2 the material W is secured in the channel by wedge blocks 34–35 arranged in pairs along the length of the material and between the latter and one or the other upstanding rail 16 or 17 of the channel 14.

With the foregoing arrangement the router R can be moved in various directions in a common horizontal plane above the material W. It is thereby possible to scribe or cut into the material W with the cutting bit H to form grooves, vanes or fluting in the material in a freehand manner. The arrangement is, however, provided with a lateral extension 36 of the table or base 11 upon which a template 37 can be mounted for guiding the movement of the router mounted on the carriage 15. The template 37 is secured firmly upon the extension 36 of the table 11 and against the adjacent upstanding rail 16 of the channel 14 to align the template therewith. This may be done by clamps C as shown in FIG. 2.

For causing the carriage to move in accordance with the shape of the template 37 a stylus 40 for engaging the shaped edge of the template is mounted on the carriage 15. The stylus 40 is arranged on a rod 41 mounted for sliding movement in a boss 42 which may be formed as a part of the base B of the router as shown or secured to the platform 30 as desired. The rod 41 is arranged parallel to the guide tracks 18 and 19, transversely to the channel 14, and extends beyond the platform 30 over the template 37. A wing screw 43 threaded into the boss 42 serves to secure the rod 41 in any desired position relative to the platform 30.

The outer end of the rod 41 has a bore 44 diametrically thereof through which the stylus 40 extends and a set screw 45 threaded into the rod 41 serves to secure the stylus 40 in any position of adjustment relative to the rod 41. As best seen in FIGS. 1 and 2 the stylus 40 extends downwardly from the rod 41 such that the lower end 46 of the stylus is disposed to engage the contour edge E of the template 37. For purposes of this disclosure the stylus 40 is shown to have a roller 47 mounted on its lower end 46 although it will be appreciated that the stylus alone may be employed without a roller mounted thereon.

Referring to FIG. 4 it will be noted that the stylus 40 can be raised and/or lowered relative to the rod 41 so that the lower end 46 or the roller 47 thereon can be set to engage various levels 1 on the edge E of the template 37.

As previously mentioned the carriage 15 may be caused to follow the contour E of the template 37 manually as the operator manipulates the router as guided by the movement of the carriage. The carriage 15 is automatically forced into a position dependent upon the contour edge E by a spring arrangement 50. This spring arrangement includes a tension spring 51 having one end thereof secured to a post 52 mounted on the platform 30 and its opposite end secured to a post 53 extending up from a cross bar 54 having its ends secured to the roller tracks 18 and 19 remote from the stylus side of the carriage frame 20. The spring 51 is tensioned to draw the platform 30 across the frame 20 in a direction to cause the stylus 40 to maintain contact with the contour edge E of the template 37. The engagement of the stylus with the edge E of the template thus limits movement of the platform 30 in one transverse direction by action of the spring 51. However, as the frame 20 is moved longitudinally along the channel 14 the spring 51 yields as the stylus climbs a raised portion on the edge E and contracts as the stylus descends relative to such edge to cause the platform 30 to reciprocate transversely of the frame 20 as the latter is moved along the channel.

The platform 30 is limited against movement in an opposite direction off of the guide tracks 18 and 19 by engagement of the shank S of the router bit H against the upstanding rail 16 of the channel 14.

The device 10 as thus described is suited for cutting template conforming shapes into elongated trim boards and the like. Such boards may be moldings, scalloped facia, picture and/or shadow box frames and the like. Moreover, in addition to edgings, scroll grooving and fluting of material worked upon can be made to conform with similarly designed templates of an elongated type as well as within limited areas.

While the device of the present invention has been described in specific detail it will be appreciated that it is susceptible to variation, modification and/or alteration without departing from the spirit of the invention. I, therefore, desire to avail myself of all variations, modifications and/or alterations as may fairly come within the purview of the appended claims.

What I claim as new and desire to protect by Letters Patent is:

1. A combination of a template and work support with a portable router and means for supporting and guiding the same comprising:
   (1) a table-like base having a pair of upstanding parallel spaced rails providing a channel adapted to receive and support material to be worked upon,
   (2) means for securing material to be worked upon in said channel; and
   (3) a carriage for supporting such portable router upon the rails of said channel with the cutting bit of such router extending into the latter for cutting engagement with the material supported in said channel comprising:
      (a) a frame including a pair of roller bars mounted upon said rails for guided movement longitudinally of said channel,
      (b) a pair of roller tracks secured to said roller bars in spaced parallel relation transversely of said channel, and
      (c) a router supporting platform mounted on said roller tracks for movement transversely of said channel as said frame is moved longitudinally thereof facilitating dual directional movement of the cutting bit of said router relative to the material supported in said channel.

2. The device in accordance with claim 1 including:
   (1) a template supporting extension on said table-like base,
   (2) a template having a contoured edge,
   (3) means for securing said template on said template supporting extension, and
   (4) a stylus,
   (5) means for supporting said stylus on said platform to engage the contoured edge of said template for guiding said carriage to move the cutting bit of said router in a pattern complementary to the contoured edge of said template.

3. The device of claim 2 including yieldable means between said frame and said platform for yieldingly urging the latter in a direction to maintain said stylus in contact with the contoured edge of said template during longitudinal movement of said carriage upon the rails of said channel.

4. The device of claim 3 in which said yieldable means comprises:
   (1) a tension spring,
   (2) a post on that side of said frame opposite said template supporting extension and having one end of said tension spring secured thereto and engageable by said platform for limiting movement of said platform in a direction away from said template supporting extension, and
   (3) a post on said platform having the opposite end of said tension spring secured thereto for drawing said platform toward said first named post.

5. The device of claim 2 in which said means for supporting said stylus comprises:
   (1) a boss formed on said platform having a bore parallel to the roller tracks of said frame,
   (2) a rod arranged in said boss and having one end extending above the template supporting extension of said table-like base,
   (3) means on said one end of said rod for receiving and supporting said stylus in suspended position therefrom to engage the contoured edge of said template, and
   (4) means for securing said rod to said boss.

6. The device in accordance with claim 1 including:
   (1) a template having a contoured configuration formed thereon, (2) means for securing said template adjacent one of the upstanding rails of said channel, (3) a stylus pin having one end thereof adapted to engage the contoured configuration on said template for following the same, (4) a rod having a bore through one end thereof for receiving and supporting said stylus pin in variable positions of vertical dependence from said rod, (5) means on said platform for receiving the opposite end of said rod and for supporting the latter in transverse disposition relative to said channel with said bored end of said rod extended over said template.

7. The device of claim 6 including:

(1) means for securing said rod in variable positions of extension relative to said platform.

8. The device of claim 7 including:

(1) a stop means mounted on that side of said frame adjacent the other one of the upstanding rails of said channel and engageable by said platform for limiting movement thereof in one direction transversely of said channel, and (2) a tension spring having one end secured to said frame and its opposite end secured to said platform for urging the latter toward said stop means.

9. The device in accordance with claim 1 in which the upstanding rails of said channel each have an elongated groove formed on its upper edge for receiving and supporting a respective one of said roller bars and for guiding the same for longitudinal movement relative to said channel; and in which each of said roller bars has a plurality of rollers mounted in spaced relation along its lower edge for tangent engagement with the floor of the groove in which said roller bar is disposed.

10. The device in accordance with claim 9 in which said roller tracks each include a plurality of rollers arranged in spaced relation along the length of said tracks and extending slightly above the upper edge thereof, and a pair of channel-like grooves on the lower surface of said platform in spaced parallel relation in register with said roller tracks for guided movement parallel thereto in tangential contact with the rollers of said tracks.

References Cited

UNITED STATES PATENTS

| | | |
|---|---|---|
| 668,771 | 2/1901 | Butler et al. |
| 1,753,206 | 4/1930 | Johnson. |
| 2,172,313 | 9/1939 | Young _____ 83—565 X |
| 2,990,861 | 7/1961 | Macks et al. _____ 144—136 |

DONALD R. SCHRAN, *Primary Examiner.*

U.S. Cl. X.R.

83—413; 90—12